Feb. 13, 1962  A. H. PETERS  3,020,615
CONDUIT MOLDING FORM
Filed Nov. 26, 1958
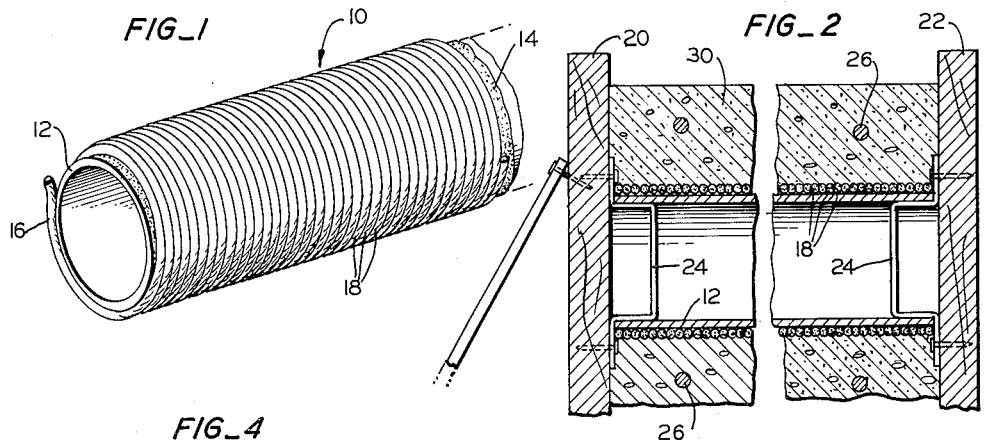
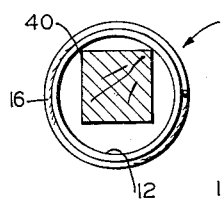
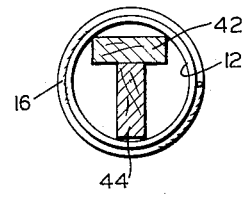
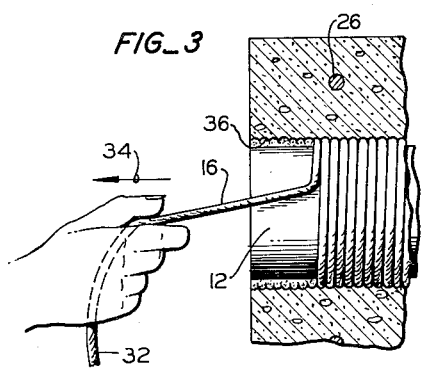
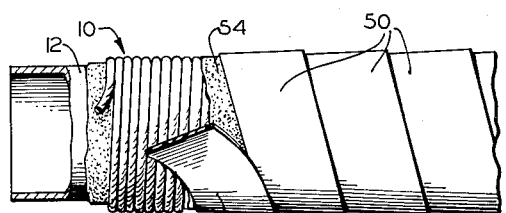
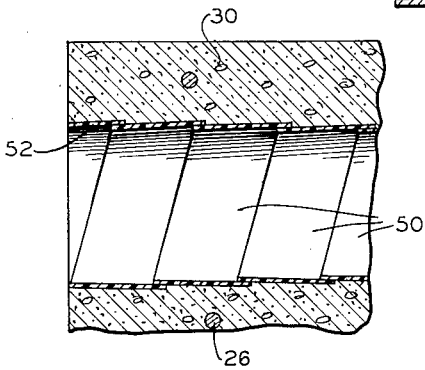
INVENTOR.
ALFRED H. PETERS
BY
*Fletcher & Swain*
ATTORNEYS

3,020,615
CONDUIT MOLDING FORM
Alfred H. Peters, Richmond, Calif.
(1315 Capuchino, Burlingame, Calif.)
Filed Nov. 26, 1958, Ser. No. 776,563
3 Claims. (Cl. 25—128)

This invention relates generally to conduit molding forms such as are used by cement contractors, construction workers and the like.

In general, it is an object of the invention to improve upon the construction of such forms, particularly with respect to means provided for facilitating rapid removal of the core from a molded conduit.

It is another object to provide a molding form of the above type which will overcome the difficulty of the form becoming bonded to the concrete, and which will permit removal of the form without the use of special tools.

It is another object of the invention to provide such a molding form that can be quickly and easily cut to different lengths as needed for a particular molding operation.

It is another object of the invention to provide a molding form that is readily adaptable to existing techniques of pouring concrete and to related activities such as placing of reinforcing rods, etc.

Additional objects and advantages of the invention will appear from the following descriptions and the drawing in which:

FIGURE 1 is a view in perspective of a conduit molding form embodying the invention;

FIGURE 2 is a view in section of the placement and mounting of the form in a typical pouring application;

FIGURE 3 is a like view showing the technique of removing the form after the concrete has hardened;

FIGURES 4 and 5 are views in transverse section of alternate procedures for mounting the molding form;

FIGURE 6 is a view in side elevation, with parts broken away, of a modification of a conduit molding form in accordance with the invention; and FIGURE 7 is a view like FIGURE 3 of the interior of a formed conduit prepared by means of the molding form of FIGURE 6.

Generally stated, a conduit molding form of the present invention comprises a central tube of cardboard, plastic or other suitable material about which is wound a cord, tape or other flexible winding. The convolutions of the cord are preferably in close contact with one another and are secured to the tube by means of adhesive material so that the tube can be cut into desired lengths without separation of the cord from the tube. The adhesive is preferably water soluble so that the cord will become loosened from the tube in the presence of the wet cement poured about the form. Upon hardening of the cement, the molding form is removed by pulling on one end of the cord to remove it from between the core and the wall of the molded conduit. Thereafter the core can be easily removed from the conduit with the entire removal operation taking but a few seconds of time.

Referring to the drawing in detail, 10 represents a conduit molding form comprising a hollow tubular core 12 coated with a suitable adhesive material 14 and wound with a compact spiral winding of cord 16. As illustrated, the individual convolutions 18 of the cord are in close proximity to one another and preferably are wound sufficiently tight to be in contact along the entire length of the molding form. It is contemplated that the molding form can be of substantial length, say five to fifteen feet, and that sections of shorter length can be cut as needed.

In the use of the device, a section of the wound tube 10 of desired length is attached between two concrete forms 20 and 22 by means of the flanged end supports 24. A preferred procedure is to nail one of the supports 24 to an exterior form prior to the installation of armored conduit, reinforcing steel, etc., as generally represented at 26. The workman seeing the support 24 in place will know that this represents an area which is to be left open during the placement of the reinforcement. After these preliminary activities, the section 10 can be positioned with one end over the left hand support 24 and the other end over the right hand support, as illustrated. Thereafter the right hand support can be nailed to the form 22.

When the form is in place, the concrete may be poured around it. The end supports 24 prevent disalignment of the molding form and insure a true forming of the desired conduit. The end supports 24 also seal the open ends of the tubular core 12 so that moisture must slowly permeate through the windings 18 to reach the adhesive material 14. Ultimately, however, the adhesive 14 will soften and dissolve in the presence of the moisture so that the windings become loosened from the tubes while the molding form is still in place.

When the poured concrete 30 has hardened, and the outer forms 20 and 22 are removed, the molding form 10 may be quickly and easily removed. Such removal is illustrated in FIGURE 3, where one end 32 of the cord 16 is shown grasped in the hand of the worker for purposes of pulling it outward from the form as indicated by the arrow 34. The cord quickly separates from both the core 12 and the inside surface 36 of the conduit so that its removal takes but a matter of seconds. Thereafter it is an easy matter to withdraw the core 12 longitudinally from the formed conduit.

It will be understood that prior to the above procedure, the end supports 24 can be pried loose from the base of the concrete by use of any convenient device such as a nail or a screw driver. However, in some cases it is desirable to employ other types of support for the molding form which do not require separate end supports. By way of example, the molding form 10 can be conveniently supported on a single wooden support 40 nailed between the two forms 20 and 22 (FIGURE 4), or a three point support can be provided by a pair of wooden supporting elements 42, 44 (FIGURE 5).

FIGURE 6 illustrates a modified version of the molding core wherein the core 10 is wrapped with a plurality of overlapping convolutions 50 of an outer protective wrapping 52 of tape, waxed paper, plastic, or other suitable material. Preferably this material is moisture resistant so that the length of tube will be protected from weathering while on a building site. In use, the wrapping 52 can be stripped from the tube and the tube 10 used in the manner described above. The tape 52 can be provided with its own adhesive or, if desired, a separate adhesive 54 can be provided as illustrated in FIGURE 6. In some cases, it may be desirable to leave the wrapping in place during the molding operation so that the interior of the molded conduit will adhere to the wrapping, as illustrated in FIGURE 7. It will be apparent that this arrangement provides a somewhat smoother interior lining of the conduit than provided by the procedure illustrated in FIGURE 3.

From the above description, it will be apparent that the conduit molding forms of the invention can be employed in a wide variety of conduit molding operations, simply, and with a minimum of effort. More important, they can be removed from the concrete in a few seconds time, and without damage to the interior of the conduit opening. Since there are often hundreds of such openings in a single building, several man hours of work may be saved solely in the operation of removing the forms from the hardened cement, at a substantial economic saving to the contractor or owner.

I claim:

1. As a new article of manufacture, a conduit molding form of substantial length and capable of being readily cut to shorter lengths, said form comprising a hollow thin-walled easily cut tubular core, a continuous spiral winding of flexible easily cut material tightly engaged upon the surface of said core and extending along its entire length, said flexible material being substantially circular in cross section to facilitate its being pulled endwise from the surface of the core, and a water soluble adhesive material coating the exterior of said core and securing said winding to said core, said adhesive also securing adjacent convolutions of said windings to one another so as to facilitate cutting of said core and winding without unraveling of said winding, said core and winding being water permeable in wet molding operations to facilitate subsequent removal of first the winding and then the core.

2. A conduit molding form as in claim 1 in which said hollow tubular core is constructed of cardboard.

3. A conduit molding form as in claim 1 provided with an outer moisture resistant spiral wrapping, said outer wrapping being in strip form, and an additional layer of adhesive material securing said outer wrapping to said winding.

References Cited in the file of this patent

UNITED STATES PATENTS

| | | |
|---|---|---|
| 366,457 | Chenoweth | July 12, 1887 |
| 1,950,018 | Anderson | Mar. 6, 1934 |
| 2,657,447 | Pellanda | Nov. 3, 1953 |
| 2,765,511 | Greene | Oct. 9, 1956 |